United States Patent [19]
Yasumoto et al.

[11] Patent Number: 5,960,250
[45] Date of Patent: Sep. 28, 1999

[54] BEARING MATERIAL

[75] Inventors: Satosi Yasumoto; Tosiyuki Hosino; Keniti Amano, all of Kurashiki; Atsuhiko Ohta; Michiro Hamanoue, both of Osaka, all of Japan

[73] Assignees: Kawasaki Steel Corporation, Kobe; Koyo Seiko Co., Ltd., Osaka, both of Japan

[21] Appl. No.: 08/930,183
[22] PCT Filed: Feb. 26, 1997
[86] PCT No.: PCT/JP97/00549
 § 371 Date: Oct. 20, 1997
 § 102(e) Date: Oct. 20, 1997
[87] PCT Pub. No.: WO97/32050
 PCT Pub. Date: Sep. 4, 1997

[30] Foreign Application Priority Data

Feb. 29, 1996 [JP] Japan .................................. 8-042703
Feb. 29, 1996 [JP] Japan .................................. 8-042704
Feb. 18, 1997 [JP] Japan .................................. 9-033471

[51] Int. Cl.$^6$ .................................................. B22F 3/00
[52] U.S. Cl. ...................... 428/546; 428/639; 428/688; 428/698; 252/572; 508/103; 508/108
[58] Field of Search .................................... 428/688, 546, 428/639, 698; 252/512; 508/103, 108

Primary Examiner—Timothy M. Speer
Attorney, Agent, or Firm—Oliff & Berridge, PLC

[57] ABSTRACT

Bearing materials used for rolling bearings, such as roller bearings and ball bearings, and in particular, a bearing material having an extended rolling contact fatigue life.

A bearing material having an extended rolling contact fatigue life comprises: 0.95 to 1.10 mass % of C, 0.15 to 0.70 mass % of Si, 1.15 mass % or less of Mn, 0.90 to 1.60 mass % of Cr and 0.025 mass % or less of P, and further 0.025 mass % or less of S and 0.0012 mass % or less of O as elements forming nonmetal inclusions, and the balance being Fe and incidental impurities, and the bearing material further contains 0.020 mass % or less of AlN, or the number of nonmetal sulfide inclusions each having a thickness of 1 $\mu$m or more is 1,200 or less in an observation area of 320 mm$^2$ for further extending the rolling contact fatigue life.

18 Claims, 8 Drawing Sheets

BEARING MATERIAL

BACKGROUND OF THE INVENTION

1. Technical Field

The present invention relates to bearing materials used for rolling bearings, such as roller bearings and ball bearings. In particular, the present invention relates to a bearing material having an extended rolling contact fatigue life.

2. Background Art

Bearings require excellent durability against fatigue, and thus bearing materials also require an extended rolling contact fatigue life.

One of generally known methods for extending the rolling contact fatigue lives of bearing materials is reduction of nonmetal oxide inclusions contained in the materials. Such reduction of the nonmetal oxide inclusions have been achieved by decreasing the oxygen content in the materials. At present, the oxygen content in the materials can be decreased to 10 ppm or less by weight due to the progress in refining technologies. The reduction of the oxygen content, however, has reached its limit, and further extension of the rolling contact fatigue life is not expected by such a method.

Under such circumstances, several methods other than reduction of the oxygen content have been proposed for extending the rolling contact fatigue life. For example, Laid-Open Patent No. 3-126839 discloses a bearing material having an extended life which is achieved by the reduction of the number of nonmetal oxide inclusions per unit area or volume. Japanese Laid-Open Patent No. 5-25587 discloses a bearing material having an extended life which is achieved by the reduction of a maximum diameter of nonmetal oxide inclusions, which is estimated from statistics of extreme-value. Further, Japanese Laid-Open Patent No. 4-280941 discloses a bearing steel having an extended rolling contact fatigue life, in which the length and number of nonmetal sulfide inclusions in the steel are controlled so that the inclusions having a maximum length of not greater than 100 $\mu$m and the number of the inclusions each having a length of greater than 40 $\mu$m are 50 or less in an observation area of 160 mm².

SUMMARY OF THE INVENTION

The present inventors also have studied the further extension of the rolling contact fatigue life of bearing materials. First, the present inventors have studied the effects of statistics on the rolling contact fatigue life using high-carbon chromium-based bearing steel (JIS G4805 SUJ2). Herein, rolling fatigue tests were performed with a Mori thrust-type rolling fatigue tester under operating conditions of a Hertzian maximum contact stress of 5,260 MPa and a number of stress cycles of 30 Hz, using #68 turbine oil as a lubricant oil. The test results were plotted onto a probability paper for Weibull distribution, and were evaluated as $B_{10}$ life (a total number of loads which are repeatedly applied until flaking occurs at a failure probability of 10%).

FIG. 1 is a graph illustrating the effect on $B_{10}$ life of the number of nonmetal oxide inclusions each having a particle size of 3 $\mu$m or more in an observation area of 320 mm². FIG. 2 is a graph illustrating the effect on $B_{10}$ life of the maximum diameter of nonmetal oxide inclusions in an observation area of 320 mm². The comparison of FIG. 1 with FIG. 2 demonstrates that the maximum diameter of the nonmetal oxide inclusions has an adequate correlation with $B_{10}$ life. Further, $B_{10}$ life noticeably fluctuates at a maximum diameter region of 10 $\mu$m or less.

FIG. 3 is a graph illustrating the effect on $B_{10}$ life of the number of nonmetal sulfide inclusions each having a length of more than 40 $\mu$m, wherein the open circle represents that the maximum length of the nonmetal sulfide inclusions is less than 100 $\mu$m, and the black dot represents that the maximum length of the nonmetal sulfide inclusions is more than 100 $\mu$m. When the maximum length of the nonmetal sulfide inclusions is less than 100 $\mu$m, the more the number of nonmetal sulfide inclusions decreases, the more $B_{10}$ life is extended. On the other hand, when the maximum length of the nonmetal sulfide inclusions is more than 100 $\mu$m, no distinct correlation is found between the number of the nonmetal sulfide inclusions and the $B_{10}$ life.

Thus, the rolling contact fatigue life cannot be satisfactorily estimated only by the number of nonmetal oxide inclusions per unit area, the maximum diameter of nonmetal oxide inclusions or the number of nonmetal sulfide inclusions per unit area in view of the length of nonmetal oxide inclusions, as in the prior art technology. A further extension of the rolling contact fatigue life requires strict control of these parameters. Thus, useful steel compositions and production processes are restricted, resulting in decreased productivity.

It is an object of the present invention to provide a bearing material having a longer rolling contact fatigue life. It is another object of the present invention to provide a bearing material having excellent life and excellent productivity by controlling the morphology and quantity of inclusions.

The present invention has been performed in order to achieve the above-mentioned objects.

A first aspect of the present invention has been achieved based on the knowledge from the results shown in FIG. 4, which is a graph illustrating the effect on $B_{10}$ life of the AlN content after quenching and tempering. $B_{10}$ life is evidently extended by decreasing the AlN content to 0.020 mass % or less. However, $B_{10}$ life deteriorates when the maximum diameter of the nonmetal oxide inclusions is greater than 10 $\mu$m. The graph demonstrates that an adequate correlation is recognized between the AlN content after quenching and tempering and $B_{10}$ life. Therefore, the control of the AlN content in the material permits effectively extending the rolling contact fatigue life.

A second aspect of the present invention has been achieved based on the knowledge from the results shown in FIG. 5, which is a graph illustrating the effect on $B_{10}$ life of the number of nonmetal sulfide inclusions each having a thickness of 1 $\mu$m or more. $B_{10}$ life is evidently extended when the number of nonmetal sulfide inclusions each having a thickness of 1 $\mu$m or more is 1,200 or less. However, $B_{10}$ life decreases when the maximum diameter of the nonmetal oxide inclusions is greater than 10 $\mu$m. The graph in FIG. 5 demonstrates that an adequate correlation is recognized between the number of nonmetal sulfide inclusions each having a thickness of 1 $\mu$m or more and $B_{10}$ life. The control of the number of nonmetal sulfide inclusions each having a thickness of 1 $\mu$m or more in the material, therefore, permits effectively extending rolling contact fatigue life. The control based on the correlation is more effective when the maximum diameter of the nonmetal oxide inclusions is 10 $\mu$m or less.

In accordance with the present invention, a bearing material comprises 0.95 to 1.10 mass % of C, 0.15 to 0.70 mass % of Si, 1.15 mass % or less of Mn, 0.90 to 1.60 mass % of Cr and 0.025 mass % or less of P, and further comprises 0.025 mass % or less of S and 0.0012 mass % or less of O as elements forming nonmetal inclusions, with the balance being Fe and incidental impurities; the bearing material containing 0.020 mass % or less of AlN. Preferably, the bearing material further contains 0.10 to 0.25 mass % of Mo and 0.0010 mass % or less of Sb, the number of nonmetal sulfide inclusions each having a thickness of 1 μm or more is 1,200 or less in an observation area of 320 mm$^2$, or the maximum diameter of nonmetal oxide inclusions is 10 μm or less in an observation area of 320 mm$^2$.

In accordance with another aspect of the present invention, a bearing material comprises 0.95 to 1.10 mass % of C, 0.15 to 0.70 mass % of Si, 1.15 mass % or less of Mn, 0.90 to 1.60 mass % of Cr and 0.025 mass % or less of P, and further comprises 0.025 mass % or less of S and 0.0012 mass % or less of O as elements forming nonmetal inclusions, with the balance being Fe and incidental impurities; the number of nonmetal sulfide inclusions each having a thickness of 1 μm or more being 1,200 or less in an observation area of 320 mm$^2$. Preferably, the bearing material further contains 0.10 to 0.25 mass % of Mo and 0.0010 mass % or less of Sb, or the maximum diameter of nonmetal oxide inclusions is 10 μm or less in an observation area of 320 mm$^2$.

The grounds for limiting the composition of the bearing material in accordance with the present invention will now be described in detail.

The bearing material in accordance with the present invention comprises an alloy composition based on a JIS G4805 high-carbon chromium bearing steel. This bearing steel therefore will be described as a typical example of the bearing materials.

C: 0.95 to 1.10 mass %

Carbon (C) is dissolved into the matrix and is effective in reinforcement of martensite. Carbon is added in order to secure the strength of the bearing steel after quenching and tempering and extends rolling contact fatiguee life. Such advantages cannot be achieved at a content of less than 0.95 mass %. On the other hand, at a content over 1.10 mass %, massive carbide forms during casting, workability deteriorates, and rolling contact fatiguee life decreases. Thus, the C content is limited to within a range of 0.95 to 1.10 mass %.

Si: 0.15 to 0.70 mass %

Silicon (Si) is dissolved in the matrix and increases resistance to temper softening. Si increases strength after quenching and tempering and is effective in extending the rolling contact fatigue life. The Si content for achieving such advantages ranges from 0.15 to 0.70 mass %.

Mn: 1.15 mass % or less

Manganese (Mn) improves hardenability of the steel. Therefore, Mn improves toughness and hardness of the martensitic matrix and is effective in extending rolling contact fatigue life. Such advantages can be achieved by an addition of 1.15 mass % or less of Mn. Although the lower limit is unnecessary, at least 0.10 mass % of Mn is generally added in order to decrease the oxygen content in the steel.

Cr: 0.90 to 1.60 mass %

Chromium (Cr) improves strength and abrasion resistance of the bearing steel due to improved hardenability and stable carbide formation. Therefore, Cr extends the rolling contact fatigue life. A Cr addition of 0.90 to 1.60 mass % is required for achieving such improvements.

P: 0.025 mass % or less

It is preferred that the P content be as low as possible, since it decreases the toughness and rolling contact fatigue life of the steel. The allowable upper limit of P is 0.025 mass %.

S: 0.025 mass % or less

Sulfur (S) bonds to Mn to form sulfide inclusions such as MnS and improve machinability. Since an excessive amount, however, decreases rolling contact fatigue life, the upper limit of the S content is set to be 0.025 mass %. It is preferred that the upper limit be 0.003 mass % in order to control the number of inclusions within a specified range in conventional melting and rolling processes.

O: 0.0012 mass % or less

Oxygen (O) forms hard nonmetal oxide inclusions and decreases rolling contact fatigue life. Therefore, it is preferred that the O content be as low as possible. An O content of 0.0012 mass % or less is allowable for achieving the present invention. Thus, the upper limit of the O content is set to be 0.0012 mass %. It is preferred that the upper limit be 0.0006 mass % in order to control the maximum diameter of the inclusions within a given range in conventional melting processes.

Mo: 0.10 to 0.25 mass %

Molybdenum (Mo) can be added when necessary in the present invention. Since Mo is expensive, it is added only when further improvement in hardenability is required. An addition of 0.10 to 0.25 mass % of Mo is capable of improving hardenability.

Sb: 0.0010 mass % or less

Antimony (Sb) may be contained in raw materials such as scrap metal and decreases rolling contact fatigue life. Therefore, the upper limit of the Sb content must be controlled to be 0.0010 mass % by careful selection of scrap metal. FIG. 6 is a graph illustrating the effect on $B_{10}$ life of the Sb content in the steel. Since FIG. 6 demonstrates that $B_{10}$ life significantly decreases at a Sb content of over 0.0010 mass %, the upper limit of Sb content is set to be 0.0010 mass %.

AlN: 0.020 mass % or less

Control of the aluminum nitride (AlN) content is the most important aspect of the present invention. It is preferred that the content of the compound be as low as possible in order to extend rolling contact fatigue life. As shown in FIG. 4 which is a graph illustrating the effect on $B_{10}$ life of the AlN content in the steel, rolling contact fatigue life of the bearing material significantly decreases at an AlN content of 0.020 mass % or more.

The AlN content in the steel can be effectively decreased by decreasing the Al and N contents in the steel. It can also be decreased by raising the quenching temperature, but this method will deteriorate workability in the bearing production.

In order to satisfy the above-specified AlN content, the Al content in the steel is limited to be 0.030% or less, and preferably 0.20 mass % or less, and the N content is limited to be 0.010 mass % or less, and preferably 0.008 mass % or less.

The morphology and quantity of inclusions are controlled as follows in another embodiment in accordance with the present invention.

As shown in FIG. 5, the number of nonmetal sulfide inclusions each having a thickness of 1 μm or more is set to be 1,200 or less in an observation area of 320 mm$^2$. In the present invention, the thickness 1 μm is the lower limit which permits microscopical identification of the nonmetal inclusions and it has an adequate correlation with the rolling contact fatigue life. It is preferred that the number of nonmetal sulfide inclusions be as low as possible in order to extend the rolling contact fatigue life. As shown in FIG. 5, $B_{10}$ life significantly decreases when the number of nonmetal sulfide inclusions each having a thickness of 1 μm or more is larger than 1,200 in an observation area of 320 mm$^2$. The upper limit of the number is, therefore, set to be 1,200.

FIG. 7 is a graph illustrating the effect on the number of nonmetal sulfide inclusions each having a thickness of 1 μm or more in an observation area of 320 mm² on the S content in a JIS G4805 high-carbon chromium bearing steel (corresponding to SUJ2 steel) having a composition as described above. FIG. 7 evidently demonstrates that an adequate correlation is found between them. A decreased S content in the steel therefore is effective to decrease the number of nonmetal sulfide inclusions each having a thickness of 1 μm or more. In conventional melting and rolling processes, it is preferred that the S content in the steel be 0.003 mass % or less in order to control the number of nonmetal sulfide inclusions each having a thickness of 1 μm or more to be 1,200 or less.

In a further embodiment in accordance with the present invention, the maximum diameter of nonmetal oxide inclusions is preferably 10 μm or less in an observation area of 320 mm². As shown in FIGS. 4 and 5, rolling contact fatigue life significantly decreases when the maximum diameter of the nonmetal oxide inclusions is larger than 10 μm. The upper limit, therefore, is limited to be 10 μm. FIG. 8 is a graph illustrating the effect on the maximum diameter of nonmetal oxide inclusions in an observation area of 320 mm² of the O content in the JIS G4805 high-carbon chromium bearing steel (corresponding to SUJ2 steel). FIG. 8 evidently demonstrates that an adequate correlation is found between them. A decreased O content in the steel, therefore, is effective to decrease the maximum diameter of the nonmetal oxide inclusions. In conventional melting processes, it is preferred that the O content in the steel be 0.0006 mass % or less in order to achieve a maximum diameter of 10 μm or less in the nonmetal oxide inclusions.

The maximum diameter of inclusions in the present invention means a reduced diameter of a circle having the same area as the largest nonmetal oxide inclusion in an observation area of 320 mm².

DETAILED DESCRIPTION OF PREFERRED EMBODIMENTS OF THE INVENTION

EXAMPLE 1

Figure 1:
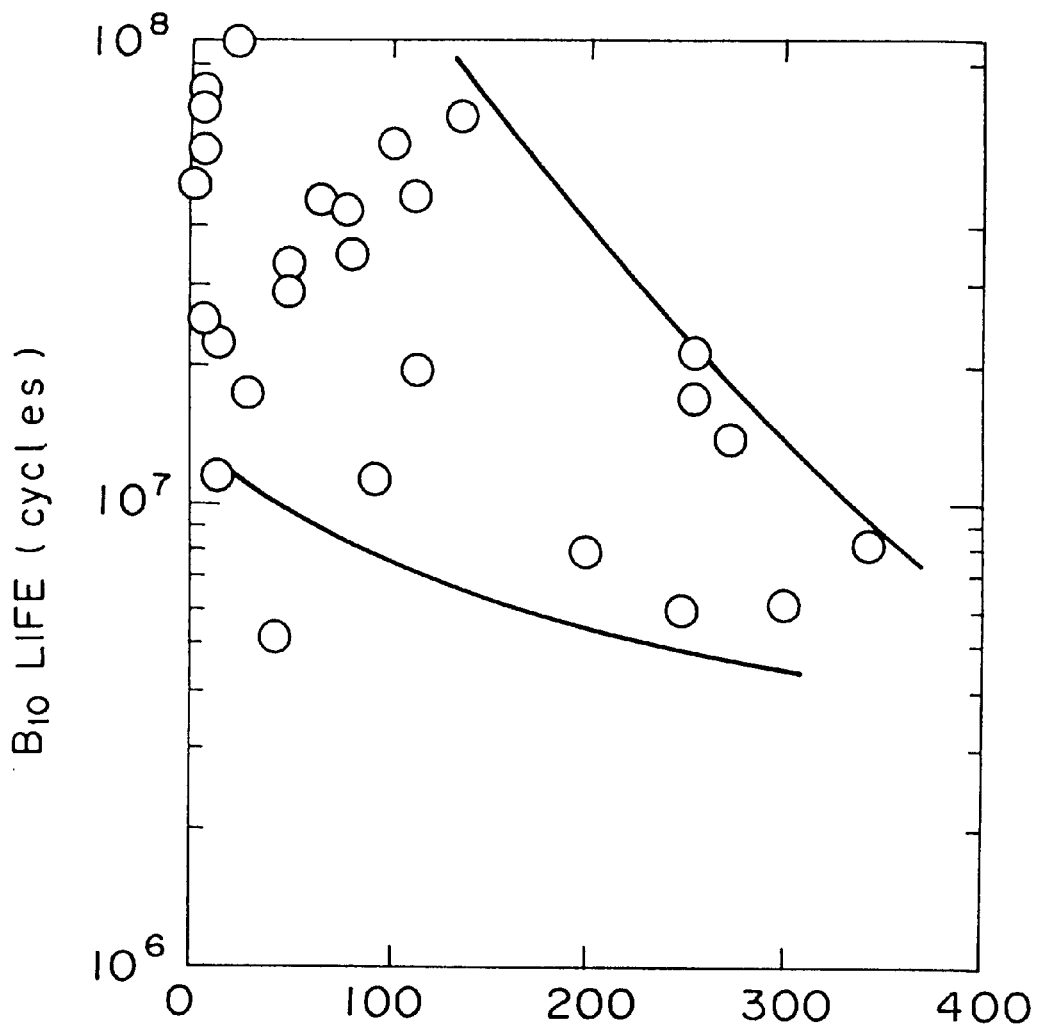
FIG. 1 is a graph illustrating the effect on $B_{10}$ life of the number of nonmetal oxide inclusions each having a diameter of 3 μm or more in an observation area of 320 mm².
Figure 2:
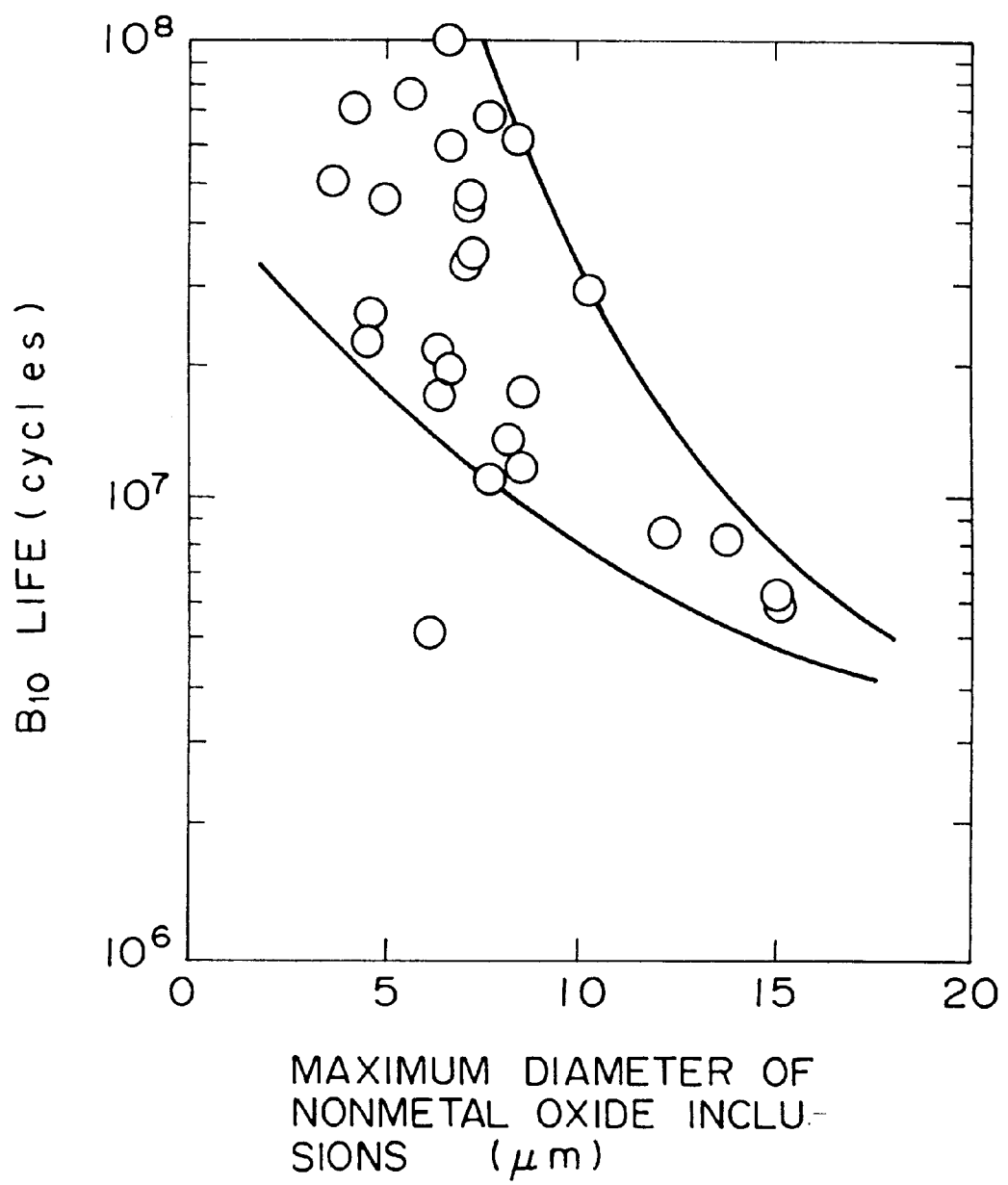
FIG. 2 is a graph illustrating the effect on $B_{10}$ life of the maximum diameter of nonmetal oxide inclusions in an observation area of 320 mm².
Figure 3:
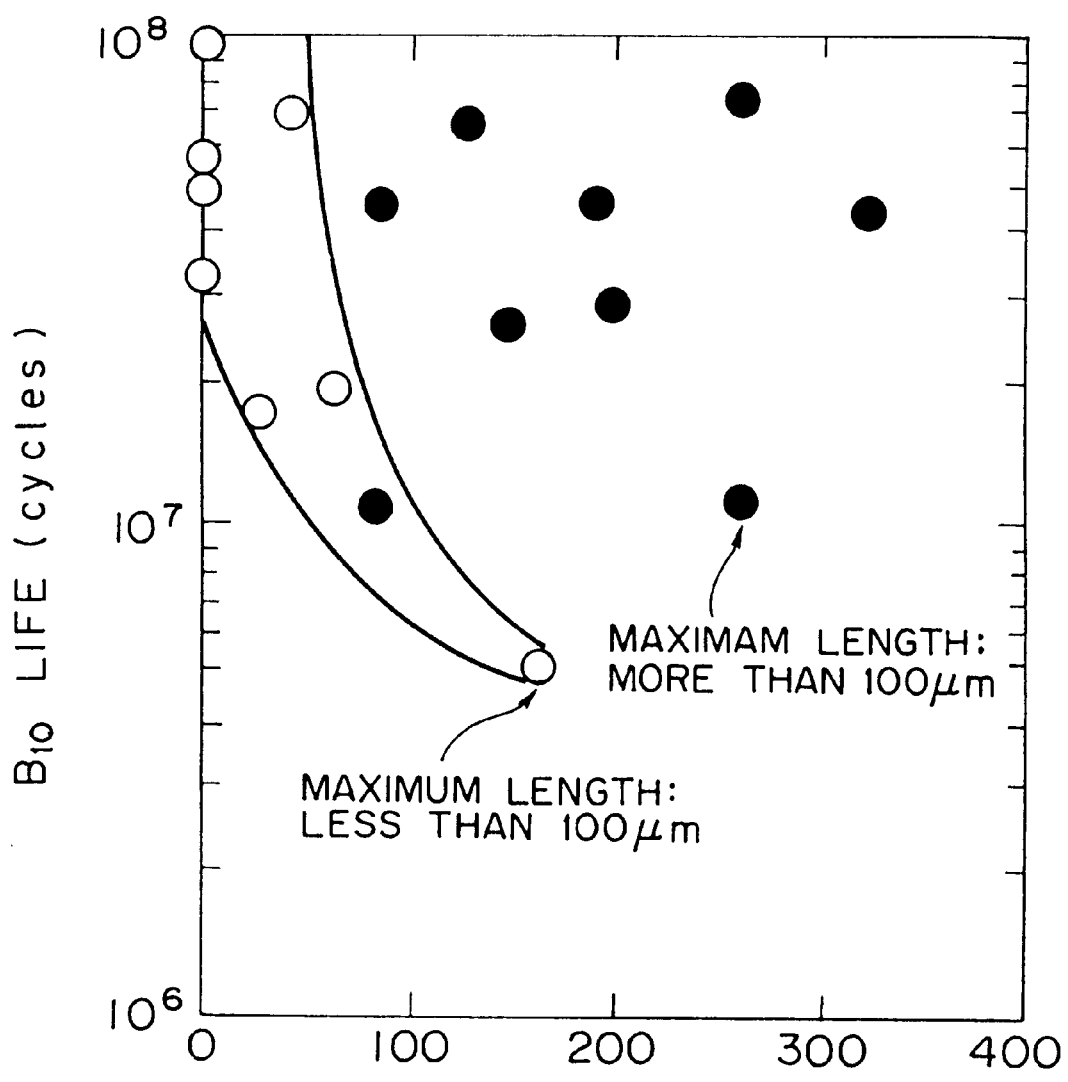
FIG. 3 is a graph illustrating the effect on $B_{10}$ life of the number of nonmetal sulfide inclusions each having a length of more than 40 μm in an observation area of 320 mm², wherein the open circle represents that the maximum length of the nonmetal sulfide inclusions is less than 100 μm in an observation area of 320 mm², and the black dot represents that the maximum length of the nonmetal sulfide inclusions is more than 100 μm in an observation area of 320 mm².
Figure 4:
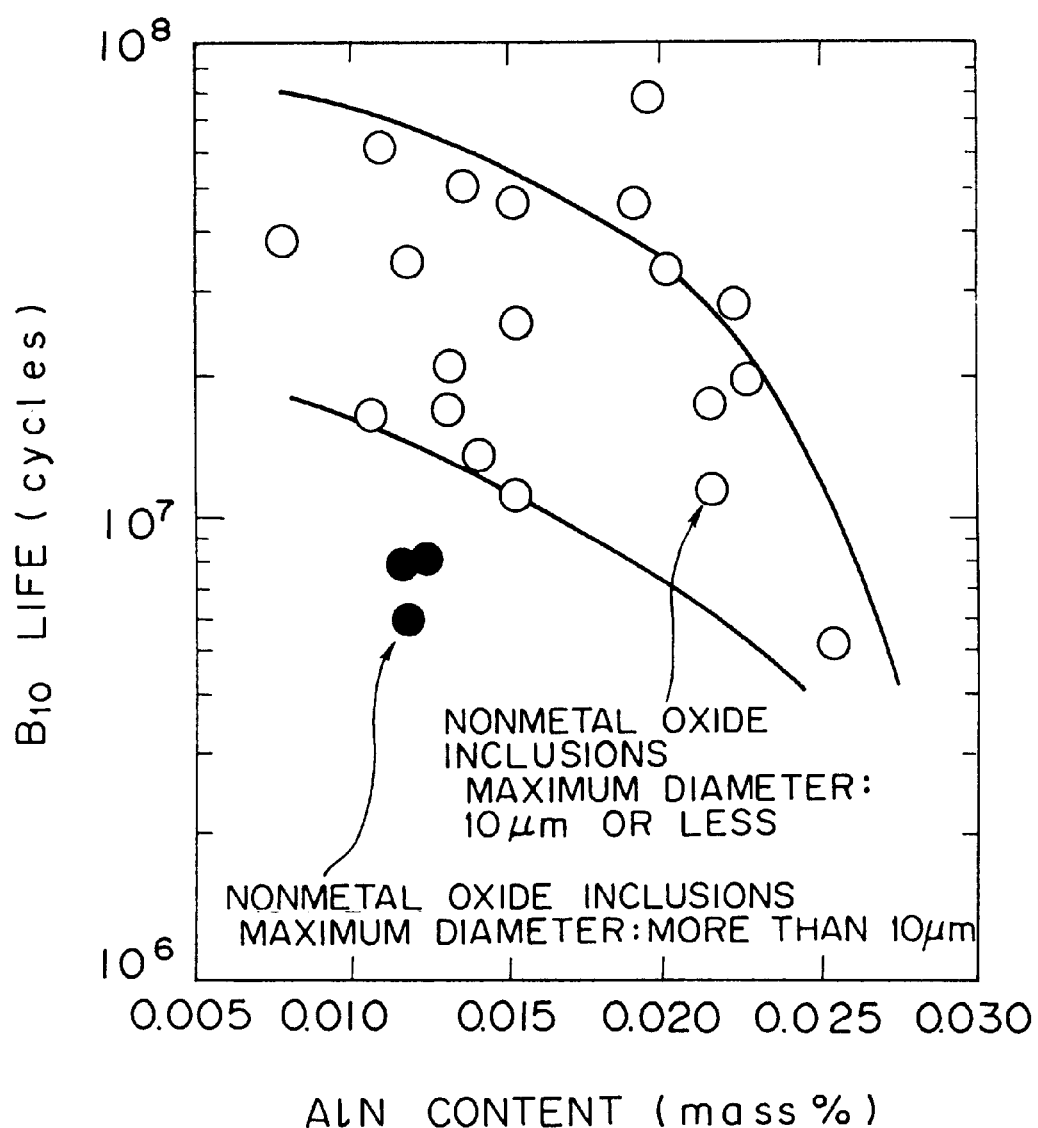
FIG. 4 is a graph illustrating the effect on $B_{10}$ life of the AlN content, wherein the open circle represents that the maximum diameter of nonmetal oxide inclusions is 10 μm or less in an observation area of 320 mm², and the black dot represents that the maximum diameter of nonmetal oxide inclusions is larger than 10 μm in an observation area of 320 mm².
Figure 5:
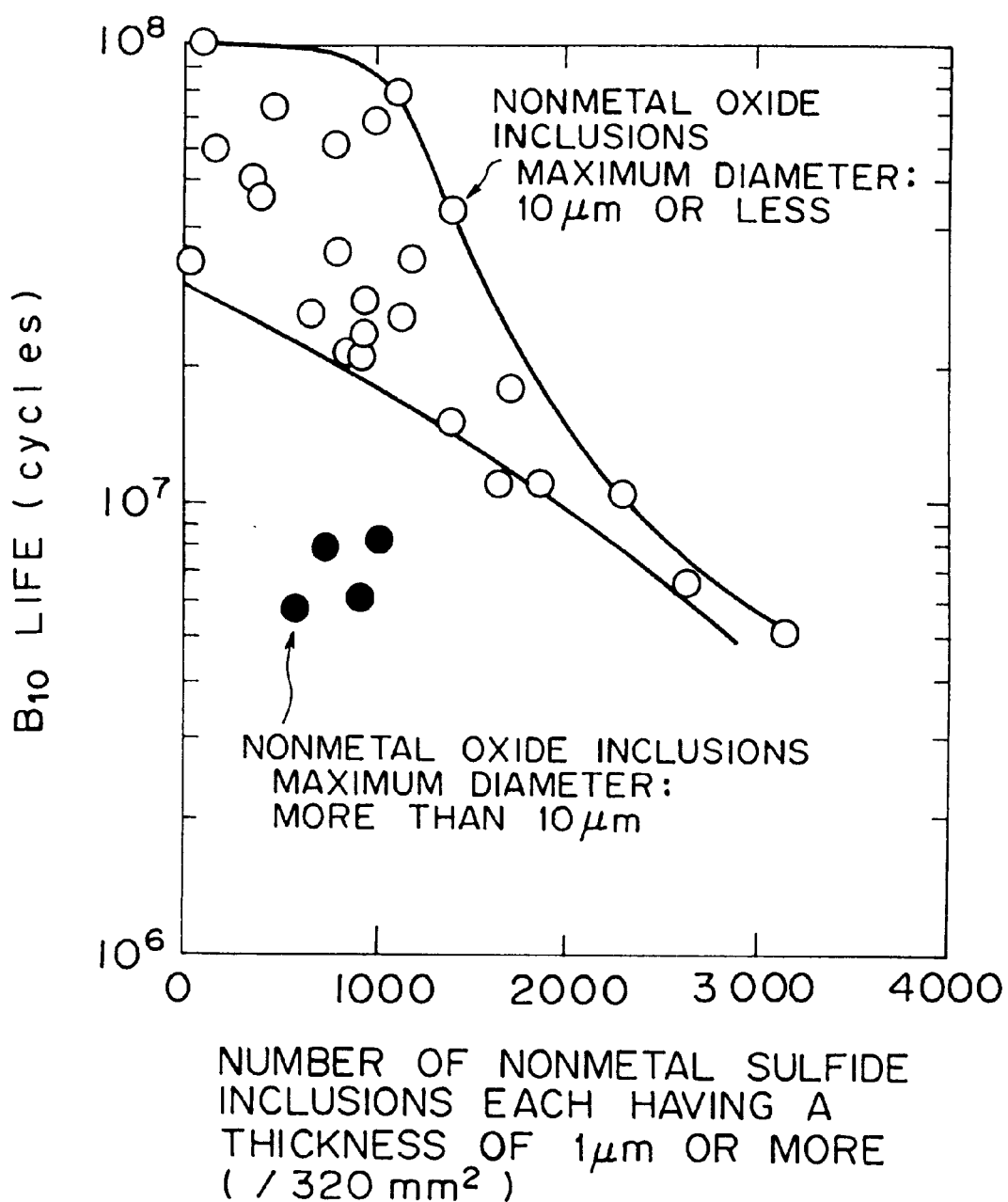
FIG. 5 is a graph illustrating the effect on $B_{10}$ life of the number of nonmetal sulfide inclusions each having a length of 1 μm or more in an observation area of 320 mm², wherein the open circle represents that the maximum diameter of nonmetal oxide inclusions is 10 μm or less in an observation area of 320 mm², and the black dot represents that the maximum diameter of nonmetal oxide inclusions is larger than 10 μm in an observation area of 320 mm².
Figure 6:
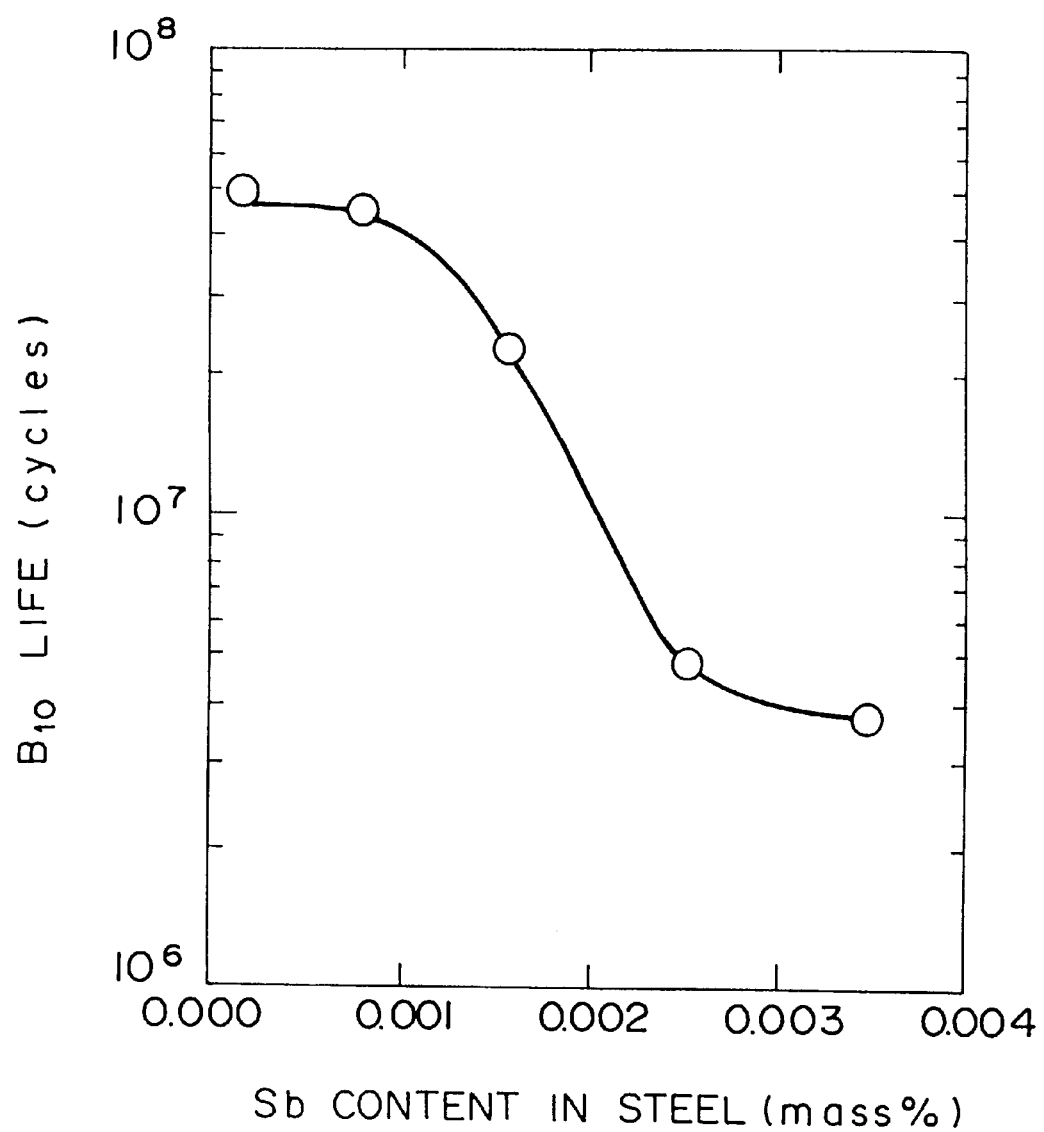
FIG. 6 is a graph illustrating the effect on $B_{10}$ life of the Sb content.
Figure 7:
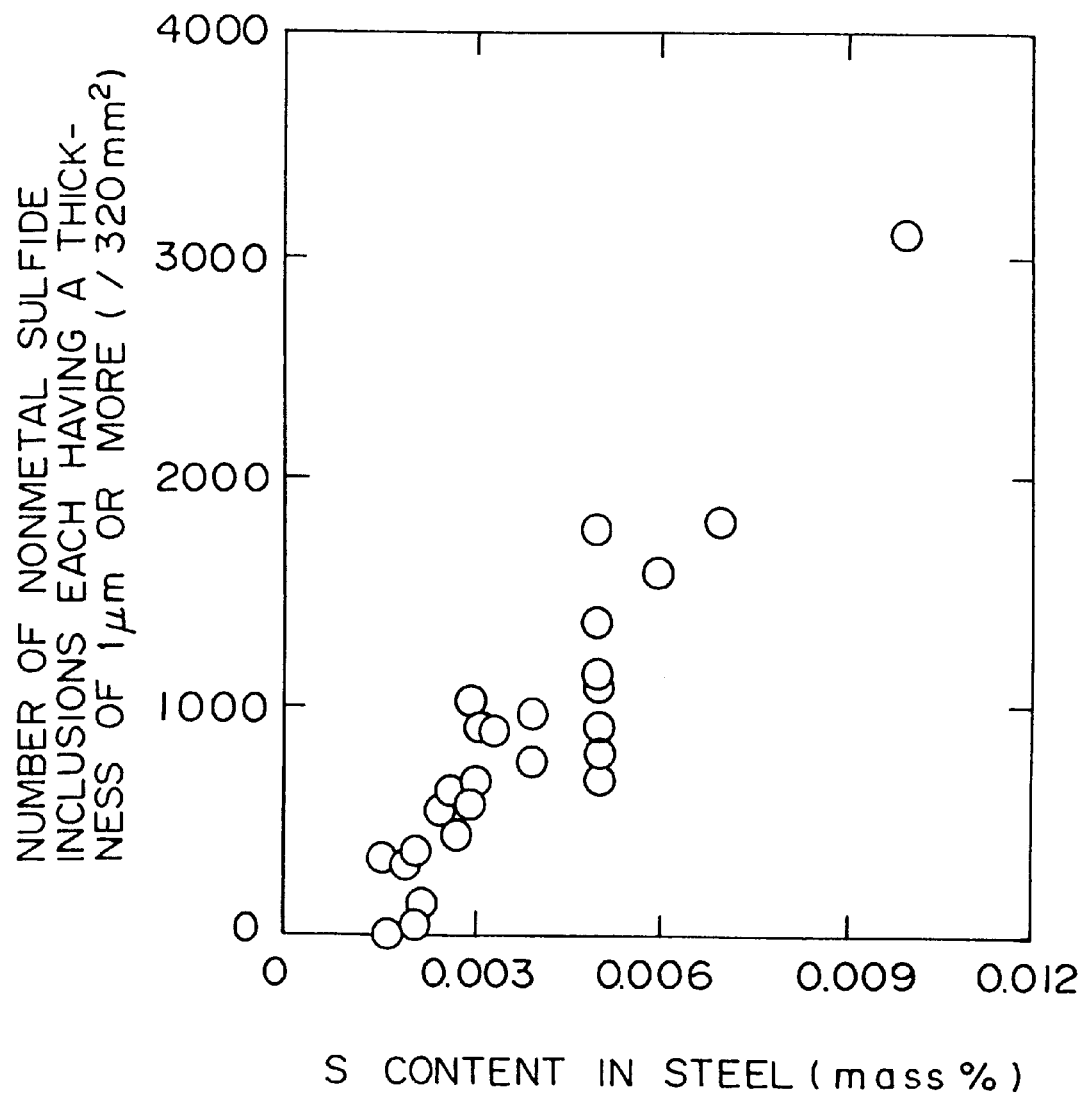
FIG. 7 is a graph illustrating the effect on the number of nonmetal sulfide inclusions each having a thickness of 1 μm or more in an observation area of 320 mm² on the S content in a steel.
Figure 8:
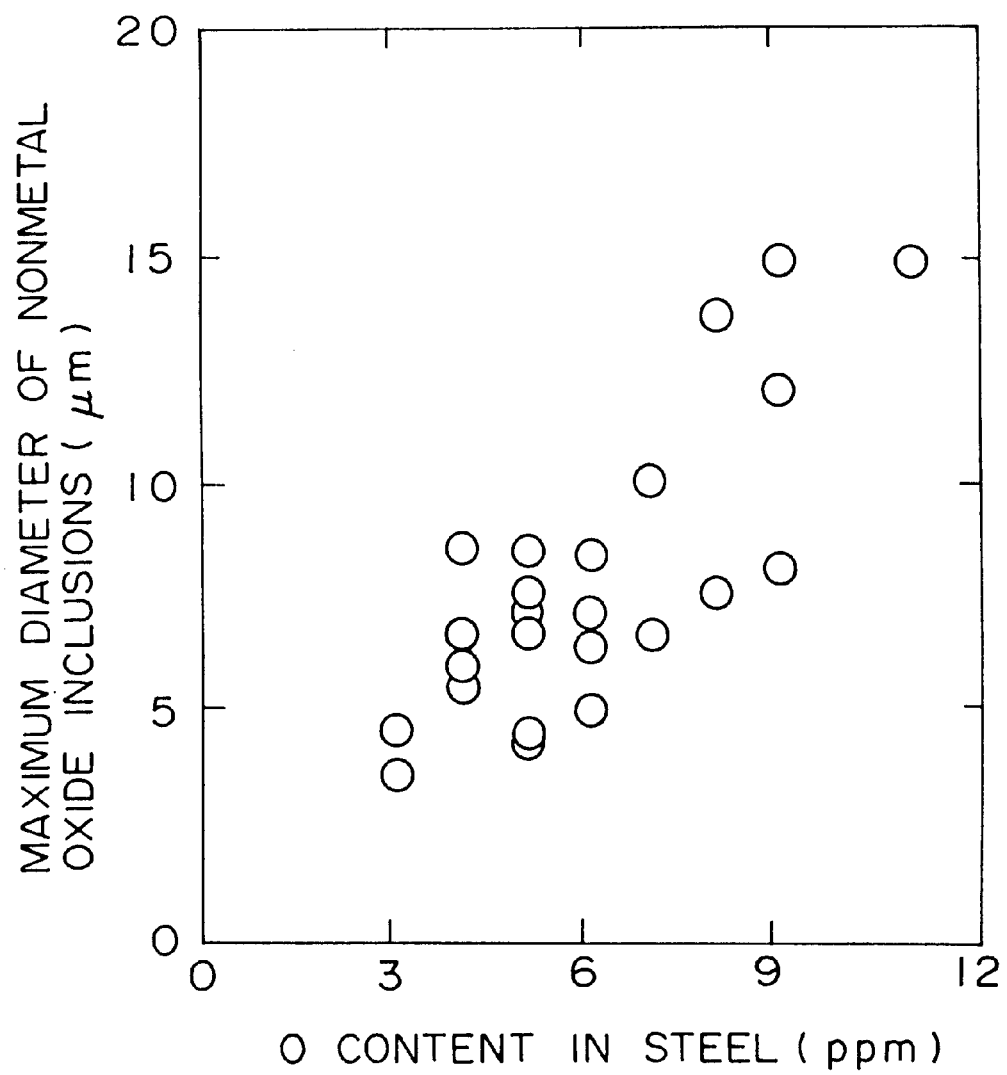
FIG. 8 is a graph illustrating the effect on the maximum diameter of nonmetal oxide inclusions in an observation area of 320 mm² on the O content in a steel.

JIS G4805 high-carbon chromium bearing steels Type 2 (SUJ2) and Type 5 (SUJ5) having compositions shown in Table 1 were melted by a conventional process using a converter, subjected to RH degassing, continuously casted and rolled into steel bars each having a diameter of 65 mm. After normalizing and then spheroidizing, each bar steel was maintained at 830° C. for 30 minutes, subjected to oil quenching and then tempering at 180 ° C. for 2 hours, and then subjected to cutting and lap-finishing to prepare a disk piece having a diameter of 60 mm and a thickness of 5 mm for a rolling contact fatigue life test.

A test piece including an observation area of 16 mm by 20 mm was prepared from the middle point between the center and the periphery of the bar steel along the rolling direction to allow observation of the maximum diameter of nonmetal oxide inclusions and the total number of nonmetal sulfide inclusions each having a thickness of 1 μm or more in the observation area.

The rolling contact fatigue test was performed with a Mori thrust-type rolling fatigue tester at a Hertzian maximum contact stress of 5,260 MPa and a stress frequency of 30 Hz using #68 turbine oil as a lubricating oil. The test results were plotted onto a probability paper on the assumption that the results have a Weibull distribution, and were evaluated as $B_{10}$ life.

The results are shown in Table 1. As shown in Table 1, the AlN content decreases after quenching and tempering as the Al or N content in the steel is reduced. When the O content in the steel is 0.0006% or less, the maximum diameter of nonmetal oxide inclusions is 10 μm or less in an observation area of 320 mm². When the S content in the steel is 0.003% or less, the number of nonmetal sulfide inclusions each having a thickness of 1 μm or more is always 1,200 or less in an observation area of 320 mm².

In a comparison of a conventional material (No. 11) with a material (No. 12) in accordance with the present invention, which have the same composition but have been quenched at different temperatures, the material in accordance with the present invention quenched at a higher temperature 850 ° C. has a lower AlN content after tempering, and thus a $B_{10}$ life about 1.5 times longer than that of the conventional sample.

TABLE 1

| | Chemical Components (mass %) | | | | | | | | | | |
|---|---|---|---|---|---|---|---|---|---|---|---|
| No. | C | Si | Mn | Cr | Mo | Al | P | S | O | N | Sb |
| 1 | 0.98 | 0.28 | 0.40 | 1.42 | — | 0.027 | 0.015 | 0.007 | 0.0009 | 0.0088 | 0.0029 |
| 2 | 0.98 | 0.28 | 0.40 | 1.42 | — | 0.027 | 0.015 | 0.007 | 0.0009 | 0.0088 | 0.0029 |
| 3 | 0.99 | 0.27 | 0.42 | 1.44 | — | 0.019 | 0.014 | 0.005 | 0.0007 | 0.0062 | 0.0030 |
| 4 | 0.99 | 0.28 | 0.43 | 1.42 | — | 0.011 | 0.012 | 0.005 | 0.0008 | 0.0044 | 0.0028 |
| 5 | 1.00 | 0.28 | 0.39 | 1.43 | — | 0.012 | 0.015 | 0.004 | 0.0007 | 0.0040 | 0.0006 |
| 6 | 1.01 | 0.29 | 0.38 | 1.43 | — | 0.012 | 0.014 | 0.002 | 0.0007 | 0.0045 | 0.0028 |
| 7 | 0.99 | 0.26 | 0.41 | 1.45 | — | 0.010 | 0.014 | 0.005 | 0.0005 | 0.0043 | 0.0009 |
| 8 | 1.01 | 0.28 | 0.39 | 1.42 | — | 0.011 | 0.013 | 0.003 | 0.0003 | 0.0040 | 0.0008 |
| 9 | 1.01 | 0.62 | 1.08 | 0.97 | 0.12 | 0.020 | 0.014 | 0.009 | 0.0009 | 0.0081 | 0.0028 |
| 10 | 1.01 | 0.61 | 1.05 | 0.97 | 0.14 | 0.010 | 0.014 | 0.005 | 0.0008 | 0.0043 | 0.0029 |
| 11 | 1.00 | 0.63 | 1.07 | 0.96 | 0.15 | 0.010 | 0.015 | 0.005 | 0.0008 | 0.0043 | 0.0006 |
| 12 | 0.99 | 0.65 | 1.07 | 0.97 | 0.15 | 0.009 | 0.012 | 0.002 | 0.0007 | 0.0038 | 0.0008 |
| 13 | 1.01 | 0.63 | 1.06 | 0.98 | 0.13 | 0.011 | 0.012 | 0.002 | 0.0004 | 0.0041 | 0.0008 |

| No. | Quenching temp. (° C.) | AlN content (mass %) | Maximum diameter of oxide (μm) | Number of sulfide inclusions having thicknesses of 1 μm or more | $B_{10}$ life (×10$^6$ cycles) | Remark |
|---|---|---|---|---|---|---|
| 1 | 830 | 0.024 | 13.8 | 2864 | 5.1 | Conventional material |
| 2 | 850 | 0.018 | 13.8 | 2864 | 7.6 | Material |
| 3 | 850 | 0.011 | 10.8 | 1642 | 10.1 | based on |
| 4 | 830 | 0.003 | 11.2 | 1818 | 12.1 | this |
| 5 | 830 | 0.003 | 10.6 | 1256 | 21.6 | invention |
| 6 | 830 | 0.004 | 10.7 | 126 | 38.4 | |
| 7 | 830 | 0.003 | 7.1 | 1321 | 50.3 | |
| 8 | 830 | 0.002 | 6.1 | 63 | 74.2 | |
| 9 | 830 | 0.021 | 16.8 | 3367 | 4.9 | Conventional material |
| 10 | 830 | 0.012 | 11.9 | 1766 | 11.6 | Material |
| 11 | 830 | 0.012 | 12.2 | 1596 | 18.4 | based on |
| 12 | 830 | 0.014 | 13.7 | 234 | 47.8 | this |
| 13 | 830 | 0.012 | 9.6 | 135 | 74.0 | invention |

The $B_{10}$ life of each of the materials (Nos. 2 to 8, and 10 to 13) in accordance with the present invention each having an AlN content of 0.020 mass % or less after quenching and tempering is 1.5 to 14.7 times or more of those of conventional materials (Nos. 1 and 9). Among them, the rolling contact fatigue life of each of the materials (Nos. 5 and 11), having a Sb content of 0.0010 mass % or less in the steel, of each of the materials (Nos. 6 and 12) in which the number of nonmetal sulfide inclusions each having a thickness of 1 μm or more is 1,200 or less in an observation area of 320 mm$^2$, and of a material (No. 7) in which a maximum diameter of nonmetal oxide inclusions is 10 μm or less in an observation area of 320 mm$^2$, is 4.2 to 10.3 times those of conventional materials. Each of materials (Nos. 8 and 13) in accordance with the present invention, in which all the conditions are within preferable ranges, have a $B_{10}$ life corresponding to approximately 15 times of those of the conventional materials.

EXAMPLE 2

JIS G4805 high-carbon chromium bearing steels Type 2 (SUJ2) and Type 5 (SUJ5) having compositions shown in Table 2 were melted by a conventional process using a converter, subjected to RH degassing, continuously casted and rolled into steel bars each having a diameter of 65 mm. After normalizing and then spheroidizing, each bar steel was maintained at 830 ° C. for 30 minutes, subjected to oil quenching and then tempering at 180 ° C. for 2 hours, and subjected to cutting and then lap-finishing to prepare a disk piece for a rolling contact fatigue life test having a diameter of 60 mm and a thickness of 5 mm.

The observation of the nonmetal inclusions and the rolling contact fatigue test were performed as in Example 1. The test results were plotted onto a probability paper on the assumption that the results have Weibull distribution, and were evaluated as $B_{10}$ life.

The results are shown in Table 2. As shown in Table 2, the maximum diameter of nonmetal oxide inclusions is 10 μm or less in an observation area of 320 mm$^2$ at an O content of 0.0006% or less in the steel. When the S content in the steel is 0.003% or less, the number of nonmetal sulfide inclusions each having a thickness of 1 μm or more is always 1,200 or less in an observation area of 320 mm$^2$.

The $B_{10}$ life of each of the materials (Nos. 15 to 19, and 21 to 23) in accordance with the present invention, in which the number of nonmetal sulfide inclusions each having a thickness of 1 μm or more is 1,200 or less in an observation area of 320 mm$^2$, is 2.2 to 10.2 times those of conventional materials (Nos. 14 and 20). Among them, the $B_{10}$ life of each of the materials (Nos. 17 and 22) having a Sb content of 0.0010 mass % or less in the steel, and of a material (No. 18), in which a maximum diameter of nonmetal oxide inclusions is 10 μm or less in an observation area of 320 mm$^2$, is 4.3 to 5.2 times those of the conventional materials. Each of the materials (Nos. 19 and 23), in which all the conditions are within preferable ranges, have a $B_{10}$ life corresponding to approximately 10 times those of the conventional materials.

TABLE 2

| No. | Chemical Components (mass %) | | | | | | | | | Maximum diameter of oxide (μm) | Number of sulfide inclusions having thicknesses of 1 μm or more | $B_{10}$ life (×10⁶ cycles) | Remark |
|---|---|---|---|---|---|---|---|---|---|---|---|---|---|
| | C | Si | Mn | P | S | Cr | Mo | Sb | O | | | | |
| 14 | 0.98 | 0.28 | 0.40 | 0.015 | 0.007 | 1.42 | — | 0.0029 | 0.0009 | 13.8 | 2864 | 5.1 | Conventional material |
| 15 | 1.01 | 0.28 | 0.39 | 0.012 | 0.004 | 1.44 | — | 0.0028 | 0.0008 | 12.7 | 576 | 11.1 | Material |
| 16 | 1.00 | 0.27 | 0.42 | 0.014 | 0.002 | 1.44 | — | 0.0030 | 0.0007 | 10.6 | 126 | 22.4 | based on |
| 17 | 1.00 | 0.29 | 0.41 | 0.015 | 0.003 | 1.42 | — | 0.0006 | 0.0008 | 11.2 | 398 | 26.5 | this |
| 18 | 1.00 | 0.29 | 0.41 | 0.015 | 0.005 | 1.42 | — | 0.0027 | 0.0004 | 6.1 | 639 | 35.2 | invention |
| 19 | 0.99 | 0.27 | 0.43 | 0.014 | 0.002 | 1.41 | — | 0.0007 | 0.0004 | 6.7 | 189 | 50.4 | |
| 20 | 1.01 | 0.62 | 1.08 | 0.014 | 0.009 | 0.97 | 0.12 | 0.0028 | 0.0009 | 16.8 | 3367 | 4.9 | Conventional material |
| 21 | 1.01 | 0.61 | 1.07 | 0.016 | 0.002 | 0.95 | 0.13 | 0.0029 | 0.0007 | 10.8 | 162 | 21.2 | Material |
| 22 | 1.02 | 0.63 | 1.08 | 0.014 | 0.002 | 0.96 | 0.13 | 0.0008 | 0.0008 | 11.5 | 109 | 23.7 | based on |
| 23 | 0.99 | 0.65 | 1.10 | 0.015 | 0.003 | 0.94 | 0.15 | 0.0008 | 0.0004 | 6.2 | 270 | 50.1 | this invention |

INDUSTRIAL APPLICABILITY

In the bearing material in accordance with the present invention as described above, rolling contact fatigue life is significantly extended and productivity is significantly improved compared to conventional materials, because the AlN content is controlled to be 0.020 mass % or less after quenching and tempering, or the number of nonmetal sulfide inclusions each having a thickness of 1 μm is controlled to be 1,200 or less.

The rolling contact fatigue life of the bearing material is further extended by controlling the maximum diameter of nonmetal oxide inclusions to be 10 μm or less in an observation area of 320 mm² or by controlling the Mo or Sb content in the steel.

What is claimed is:

1. A bearing material comprising: 0.95 to 1.10 mass % of C, 0.15 to 0.70 mass % of Si, 1.15 mass % or less of Mn, 0.90 to 1.60 mass % of Cr and 0.025 mass % or less of P, and further 0.025 mass % or less of S and 0.0012 mass % or less of O as elements forming nonmetal inclusions, and the balance being Fe and incidental impurities; the bearing material containing 0.020 mass % or less of AlN, wherein the number of nonmetal sulfide inclusions each having a thickness of 1 μm or more is 1,200 or less in an observation area of 320 mm².

2. A bearing material according to claim 1, wherein said bearing material further comprises 0.10 to 0.25 mass % of Mo.

3. A bearing material according to claim 1, wherein said bearing material further comprises 0.0010 mass % or less of Sb.

4. A bearing material according to claim 1, wherein said bearing material further comprises 0.0010 mass % or less of Sb and the number of nonmetal sulfide inclusions each having a thickness of 1 μm or more is 1,200 or less in an observation area of 320 mm².

5. A bearing material according to claim 1, wherein the maximum diameter of nonmetal oxide inclusions is 10 μm or less in an observation area of 320 mm².

6. A bearing material according to claim 1, wherein said bearing material further comprises 0.0010 mass % or less of Sb and the maximum diameter of nonmetal oxide inclusions is 10 μm or less in an observation area of 320 mm².

7. A bearing material according to claim 1, wherein the number of nonmetal sulfide inclusions each having a thickness of 1 μm or more is 1,200 or less in an observation area of 320 mm² and the maximum diameter of nonmetal oxide inclusions is 10 μm or less in an observation area of 320 mm².

8. A bearing material according to claim 1, wherein said bearing material further comprises 0.0010 mass % or less of Sb, the number of nonmetal sulfide inclusions each having a thickness of 1 μm or more is 1,200 or less in an observation area of 320 mm² and the maximum diameter of nonmetal oxide inclusions is 10 μm or less in an observation area of 320 mm².

9. A bearing material comprising: 0.95 to 1.10 mass % of C, 0.15 to 0.70 mass % of Si, 1.15 mass % or less of Mn, 0.90 to 1.60 mass % of Cr and 0.025 mass % or less of P, and further 0.025 mass % or less of S and 0.0012 mass % or less of O as elements forming nonmetal inclusions, and the balance being Fe and incidental impurities; the number of nonmetal sulfide inclusions each having a thickness of 1 μm or more being 1,200 or less in an observation area of 320 mm².

10. A bearing material according to claim 9, wherein said bearing material further comprises 0.10 to 0.25 mass % of Mo.

11. A bearing material according to claim 9, wherein said bearing material further comprises 0.0010 mass % or less of Sb.

12. A bearing material according to claim 9, wherein the maximum diameter of nonmetal oxide inclusions is 10 μm or less in an observation area of 320 mm².

13. A bearing material according to claim 9, wherein said bearing material further comprises 0.0010 mass % or less of Sb and the maximum diameter of nonmetal oxide inclusions is 10 μm or less in an observation area of 320 mm².

14. A bearing material comprising: 0.95 to 1.10 mass % of C, 0.15 to 0.70 mass % of Si, 1.15 mass % or less of Mn, 0.90 to 1.60 mass % of Cr and 0.025 mass % or less of P, and further 0.025 mass % or less of S and 0.0012 mass % or less of O as elements forming nonmetal inclusions, and the balance being Fe and incidental impurities, wherein the maximum diameter of nonmetal oxide inclusions is 10 μm or less in an observation area of 320 mm² of the bearing material.

15. A bearing material according to claim 14, wherein the number of nonmetal sulfide inclusions each having a thickness of 1 μm or more is 1,200 or less in an observation area of 320 mm² of the bearing material.

16. A bearing material according to claim 14, further comprising 0.0010 mass % or less of Sb, and a number of nonmetal sulfide inclusions each having a thickness of 1 μm or more is 1,200 or less in an observation area of 320 mm$^2$.

17. A bearing material according to claim 14, further comprising 0.0010 mass % or less of Sb and the maximum diameter of nonmetal oxide inclusions is 10 μm or less in an observation area of 320 mm.

18. A bearing material according to claim 14, further comprising 0.020 mass % or less of AlN.

* * * * *